(12) United States Patent
Tonkin

(10) Patent No.: US 8,753,487 B2
(45) Date of Patent: Jun. 17, 2014

(54) WATER PURIFICATION

(75) Inventor: Mark Christopher Tonkin, Lewes (GB)

(73) Assignee: Design Technology and Innovation Ltd, Croyden (GB)

( * ) Notice: Subject to any disclaimer, the term of this patent is extended or adjusted under 35 U.S.C. 154(b) by 778 days.

(21) Appl. No.: 12/681,483

(22) PCT Filed: Oct. 3, 2008

(86) PCT No.: PCT/GB2008/003356
§ 371 (c)(1),
(2), (4) Date: Aug. 24, 2010

(87) PCT Pub. No.: WO2009/044157
PCT Pub. Date: Apr. 9, 2009

(65) Prior Publication Data
US 2010/0314237 A1 Dec. 16, 2010

(30) Foreign Application Priority Data
Oct. 4, 2007 (GB) .................................. 0719390.7

(51) Int. Cl.
*B01D 3/04* (2006.01)
(52) U.S. Cl.
USPC ........... 202/237; 202/234; 202/197; 202/172; 202/186; 210/180
(58) Field of Classification Search
USPC ................ 202/237, 234, 172, 186, 197, 235; 203/10, DIG. 17, DIG. 9; 159/903, 159/DIG. 27, DIG. 28; 210/640, 180
See application file for complete search history.

(56) References Cited

U.S. PATENT DOCUMENTS

| 3,523,568 A | 8/1970 | Van Leeuwen |
| 4,433,552 A | 2/1984 | Smith |
| 4,583,996 A * | 4/1986 | Sakata et al. ...................... 95/50 |

(Continued)

FOREIGN PATENT DOCUMENTS

| AU | 2002328688 | 1/2008 |
| CN | 1401582 A | 3/2003 |

(Continued)

OTHER PUBLICATIONS

First Office Action issued on Jul. 7, 2011 for CN Pat. App. No. 200880117386.7, which is national phase of Intl App. No. PCT/GB2008/003356, filed Oct. 3, 2008 (Inventor—Tonkin; Applicant—Design Technology and Innovation LTD).

(Continued)

*Primary Examiner* — Nina Bhat
(74) *Attorney, Agent, or Firm* — Ballard Spahr LLP

(57) ABSTRACT

An evaporation device has an inner tube and an outer tube. The inner tube is made of a hydrophilic membrane, such as DutyionT. The outer tube is preferably made of a material that readily absorbs solar radiation and is a good heat conductor. There is a gap between the inner tube and the outer tube for the flow of air. The inner tube contains a flow of impure water. The hydrophilic membrane allows water to pass to the outside of the inner tube as vapor, but prevents impurities from passing through. Air flowing in the gap takes up the water vapor and humidified air exits the evaporation device. This humidified air is subsequently cooled to collect the vapor and provide purified water, e.g. at a condenser.

26 Claims, 4 Drawing Sheets

(56) References Cited

U.S. PATENT DOCUMENTS

| | | | |
|---|---|---|---|
| 4,620,900 A | | 11/1986 | Kimura et al. |
| 4,718,985 A | * | 1/1988 | Kjellander .................... 202/172 |
| 4,778,569 A | * | 10/1988 | Ostertag ........................ 203/49 |
| 5,290,403 A | * | 3/1994 | Saask ........................... 202/182 |
| 5,348,691 A | * | 9/1994 | McElroy et al. ............. 261/36.1 |
| 5,522,970 A | * | 6/1996 | Shimizu et al. ............... 202/197 |
| 6,709,598 B1 | | 3/2004 | Pearl |
| 6,716,355 B1 | * | 4/2004 | Hanemaaijer et al. ........ 210/640 |
| 6,793,824 B2 | * | 9/2004 | Tonkin et al. ................. 210/640 |
| 8,287,735 B2 | * | 10/2012 | Hanemaaijer et al. ........ 210/640 |
| 2006/0108286 A1 | * | 5/2006 | Hambitzer et al. ........... 210/637 |

FOREIGN PATENT DOCUMENTS

| | | |
|---|---|---|
| DE | 3142136 | 5/1983 |
| DE | 3419006 | 11/1985 |
| DE | 10230668 | 2/2004 |
| DE | 10353059 | 6/2005 |
| GB | 568726 | 4/1945 |
| JP | 2003097832 | 4/2003 |
| WO | WO 01/53211 | 7/2001 |
| WO | WO 03/008338 | 1/2003 |

OTHER PUBLICATIONS

International Preliminary Report on Patentability issued on Apr. 7, 2010 for Intl App. No. PCT/GB2008/003356, filed Oct. 3, 2008 (Inventor—Tonkin; Applicant—Design Technology and Innovation Ltd).

International Search Report. Feb. 4, 2009.

UK Search Report. Jan. 24, 2008.

* cited by examiner

WATER PURIFICATION

CROSS REFERENCE TO RELATED APPLICATIONS

The present application is a National Phase Application of International Application No. PCT/GB2008/003356, filed Oct. 3, 2008, which claims priority to Great Britain Patent Application No. 0719390.7 filed Oct. 4, 2007, which applications are incorporated herein fully by this reference.

FIELD OF THE INVENTION

The invention relates to the purification of water and, in particular, to an evaporation device for use in purifying water.

BACKGROUND TO THE INVENTION

There is an increasing demand for water suitable for drinking and irrigation. Consequently there is an increasing demand for purifying impure water, such as sea water.

German Patent Application No. 10230668 describes a scheme for purifying "raw" water in which air is humidified as it passes across an arrangement of rods while the raw water is dripped over the surface of the rods. A condenser is then used to extract purified water from the humidified air.

European Patent Application No. 1 362 833 A2 discloses a water purification apparatus comprising a water source and a hydrophilic membrane. The hydrophilic membrane allows water to pass through the membrane as a vapour, and prevents impurities passing through. That patent specification contains a description of suitable hydrophilic materials, and also the results of experiments conducted in using bags made from hydrophilic material for irrigating plants.

SUMMARY OF THE INVENTION

According to a first aspect of the invention there is provided an evaporation device for use in purifying water, comprising a first tube arranged within a second tube, wherein the first tube comprises a hydrophilic membrane, and wherein a gap is provided between the first and second tubes for the flow of air.

Therefore the invention provides an evaporation device (or, alternatively, a pervaporation device) having an inner tube comprising a hydrophilic membrane, arranged inside an outer tube, with a gap between the tubes for the flow of air. In use, impure water in the inner tube can pervaporate through the inner tube and humidify air in the gap. The use of an inner tube arranged within an outer tube channels the air close to the hydrophilic membrane to provide efficient humidification. It also provides a structure that can be readily heated by solar radiation incident on the outer tube, in particular to heat the air in the gap. This enhances the convection of the air through the device and results in warmer air, which is able to carry a greater amount of water vapour than colder air, being present in the gap. This improves the humidification capacity of the device.

In one embodiment, the first tube is arranged substantially coaxially with the second tube. Such an arrangement can provide efficient humidification and is simple to manufacture. In other embodiments, at least a portion of the first tube may be coiled or arranged in a zig-zag configuration. The coil is preferably substantially coaxial with the second tube. Likewise, the zig-zag would usually be arranged centrally in the outer tube. The inner tube itself may be smooth or corrugated. Generally, arrangements that can provide a large surface area of the hydrophilic membrane, whether by coiling, zig-zags, corrugation or otherwise, provide more efficient humidification.

The gap may contain means for creating turbulence in air flowing through it. The turbulence causes drag, causing the air to spend longer in the device. So, the air has more time to take up pervaporated water molecules from the surface of the hydrophilic membrane. Overall, take up of moisture by the air is thereby promoted. The means for creating turbulence may comprise fins attached to either or both of the outside of the first tube and the inside of the second tube. Additionally or alternatively, either or both of the outside of the first tube and the inside of the second tube could be rough or undulating, e.g. corrugated or threaded.

The second tube may comprise metal, for example copper. This improves absorption and conduction of heat from the outside of the second tube to the inside of the second tube, thereby helping to optimise heat transfer to the air in the gap.

The inside of the second tube may be coated with a black substance. This improves radiation of heat from the inside surface of the second tube to the air in the gap.

The first and second tubes are preferably arranged not to touch each other in the gap, for example by suspending one or both of the tubes, or by employing a spacer. This feature facilitates air flow over the whole outer surface of the first tube.

The evaporation device may comprise an evaporation module for housing the evaporation device. The evaporation module may comprise an elongate housing with an outwardly curved window. This serves to improve the collection of solar radiation, by acting in a similar manner to a greenhouse. This can further improve heating of the evaporation device and, in particular, air in the gap.

According to a second aspect of the invention, there is provided a system for purifying water, comprising:
  a water inlet channel for supplying impure water;
  an evaporator for humidifying air by pervaporation using the impure water supplied by the water inlet channel; and
  a condenser for condensing purified water from the air humidified by the evaporator, the condenser being cooled by the impure water supplied by the water inlet channel before it is supplied to the evaporator.

Also, according to a third aspect of the present invention, there is provided a method of purifying water, comprising:
  supplying impure water through an inlet channel;
  humidifying air with an evaporator by pervaporation using the impure water supplied by the water inlet channel; and
  condensing purified water from the humidified air with a condenser that is cooled by the impure water supplied by the inlet channel before it is supplied to the evaporator.

In this way, the impure water used for humidification may also be used for effecting condensation. This avoids the need for separate supplies of water for the evaporator and the condenser. Importantly, the impure water is heated during the condensation process, with a result that the water supplied to the evaporator is warmer than if it were supplied to the evaporator directly. This has the benefit of facilitating humidification and condensation with effectively no net increase in the overall energy requirements of the system.

The water inlet channel may comprise heating means for heating the impure water after it is supplied to the condenser and before it is supplied to the evaporator. Heating the impure water can improves humidification. However, the condensation is still effected at the temperature at which the impure water is initially supplied, prior to heating the impure water by the heating means. Another advantage of this arrangement is that convection of the impure water in the heating means it can facilitate flow of the impure water through the water inlet channel. However, in some embodiments, for example where there is a large head between the source of the impure water and an outlet from the system, this may not be sufficient to facilitate flow of the impure water through the water inlet. So, a pump may be provided for propelling water through the water inlet channel.

The heating means may be arranged to employ solar energy, which enables low cost operation and a low environmental impact.

The water inlet channel may comprise a sediment trap. This feature reduces the likelihood of sediment inhibiting the flow of impure water in the system.

The evaporator may comprise the evaporation device described above. The first and second tubes may be arranged substantially vertically with the air inlet below the air outlet. This arrangement facilitates the flow of air in the gap by convection.

However, the system may comprise forcing means for forcing the air through the gap. For example a fan may blow or suck the air. This feature can increase the volume of air that is humidified and enhance the take up of the water vapour by the air.

BRIEF DESCRIPTION OF THE DRAWINGS

The invention will now be described, by way of example, only, with reference to the accompanying drawings, wherein.

DETAILED DESCRIPTION OF THE PREFERRED EMBODIMENTS

Figure 1:
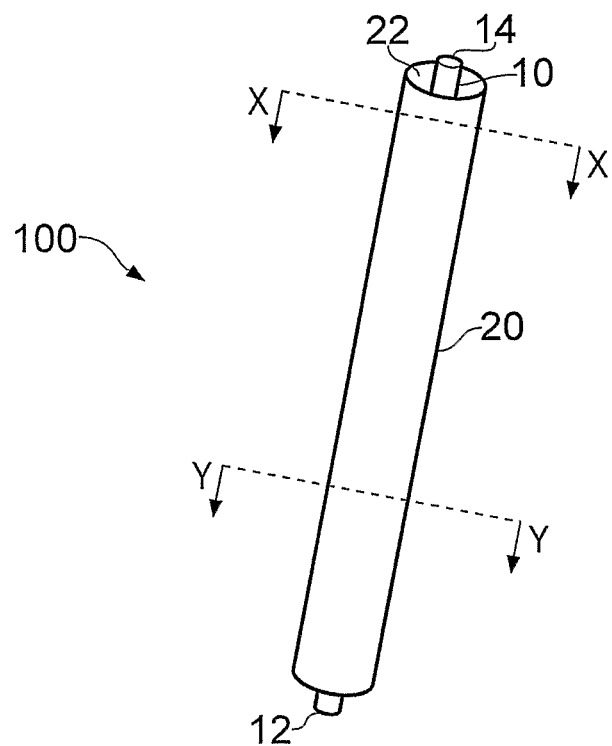
FIG. 1 is a perspective view of a first preferred embodiment of an evaporation device.
Figure 3:
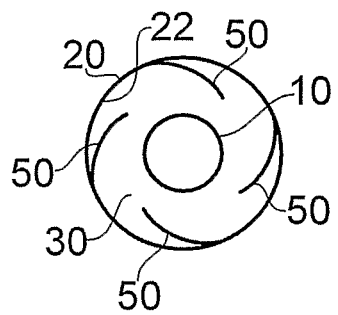
FIG. 3 is a cross-section through the evaporation device of FIG. 1, along the line Y-Y.
Figure 2:
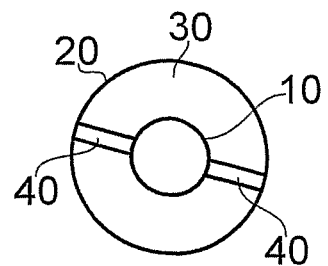
FIG. 2 is a cross-section through the evaporation device of FIG. 1, along the line X-X.

Referring to FIGS. 1 to 3, there is illustrated an evaporation device 100 having an inner tube 10 and an outer tube 20. The inner tube 10 is made of a hydrophilic membrane, such as Dutyion™. Suitable hydrophilic membranes are described in EP 1 362 833 A2. The outer tube 20 is preferably made of a material that readily absorbs solar radiation and is good heat conductor, such as a metal, for example copper, although other materials, such as plastics, are suitable. The inside 22 of the outer tube 20 may be coated with a black substance, such as a black paint, to encourage the radiation, inside the outer tube 20 towards the inner tube 10, of heat which has been absorbed by the outer tube 20.

There is a gap 30 between the inner tube 10 and the outer tube 20 for the flow of air. In FIGS. 1 to 3, the inner tube 10 and the outer tube 20 are arranged substantially coaxially to facilitate the flow of air, although this is not essential. Preferably the inner tube 10 does not touch the outer tube 20, thereby enabling air to flow in the gap all around the inner tube 10; this may be implemented, for example, by providing a spacer 40. Another suitable means of arranging that the inner tube 10 and outer tube 20 do not touch is to suspend the inner tube 10 inside the outer tube 20 by a cord or a wire.

In use, the inner tube 10 contains water, which may be impure water such as sea water. One end 12 of the inner tube 10 may be connected to a source of such water via a pipe, for which purpose a connector (not illustrated in FIGS. 1 to 3) may be provided at the end 12. Furthermore, water may be channelled away from the end 14 of the inner tube 10 via a further pipe, for which purpose a connector (not illustrated in FIGS. 1 to 3) may be provided at the end 14.

The inner tube 10 and outer tube 20 illustrated in FIGS. 1 to 3 have a circular cross-section, but this is not essential. A square, or other shape, cross-section would be suitable.

It is advantageous if the air flow within the gap 30 between the inner tube 10 and the outer tube 20 is turbulent, as this facilitates the take up of moisture into the air from the hydrophilic membrane of the inner tube 10. The turbulent air flow causes drag and this drag causes the air to take longer to pass through the gap 30, thereby giving the air longer to humidify. So, the evaporation device 100 may include means for creating turbulence, such as obstacles in the air path. Such obstacles may be provided on the outside of the inner tube 10, on the inside of the outer tube 20, or on both. In the embodiment illustrated in FIGS. 1 to 3, the evaporation device 100 has fins 50 arranged on the inside of the outer tube 20 for creating turbulence.

Figure 4:
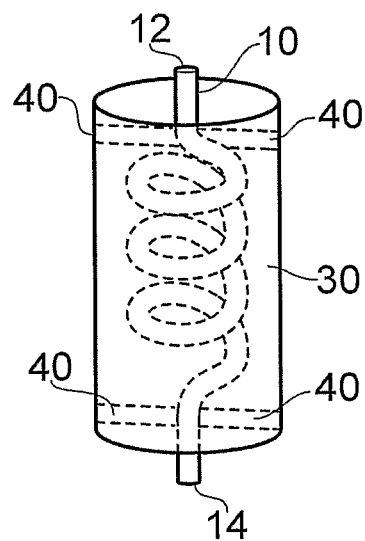
FIG. 4 is a perspective view of a second preferred embodiment of an evaporation device.
Figure 5:
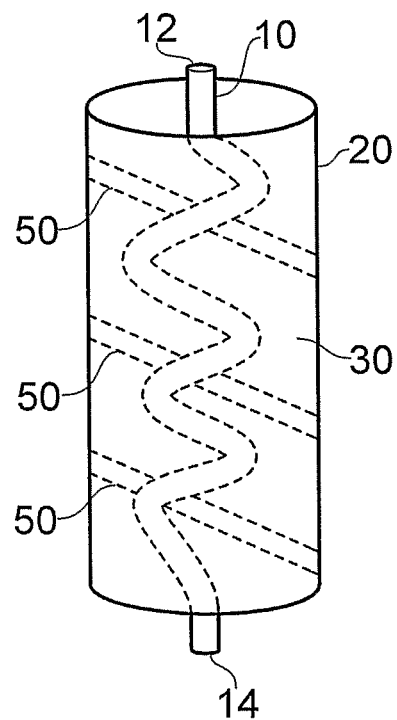
FIG. 5 is a perspective view of a third preferred embodiment of an evaporation device.

In second and third preferred embodiments, illustrated in FIGS. 4 and 5, the inner tube 10 is not arranged coaxially with the outer tube 20 but is, respectively, coiled or has a zig-zag configuration within at least part of the outer tube 20. These configurations allow the inner tube 10 have to a greater surface area of hydrophilic membrane for a given length of outer inner tube 20, which improves humidification of the air flowing in the gap 30. Other configurations of the inner tube 10 may be used. Whatever configuration is used, it is considered useful to ensure that there are no cusps in the inner tube 10, as water droplets tend to form in or near the cusps in the hydrophilic membrane, which is undesirable.

Figure 6:
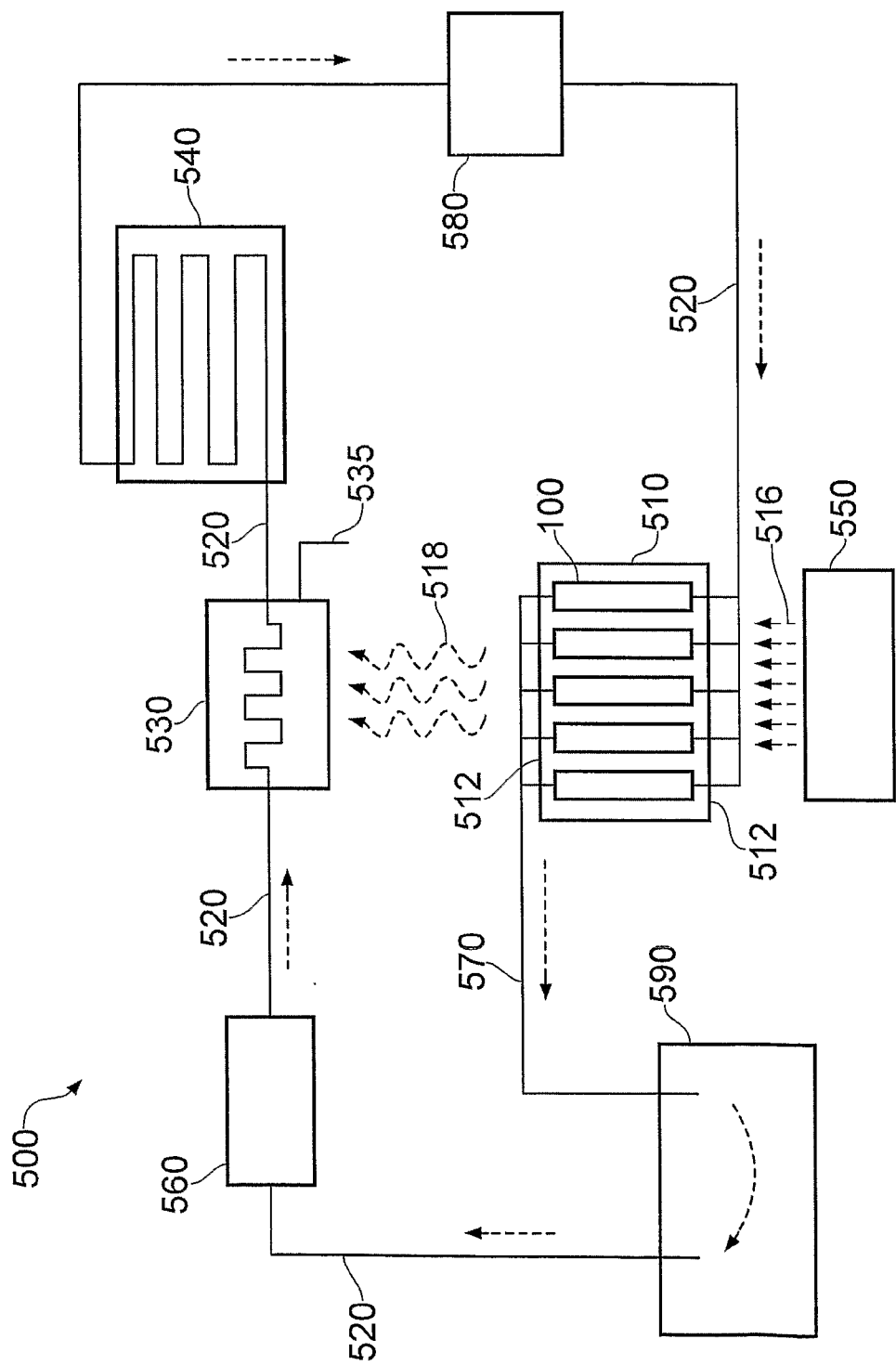
FIG. 6 is a schematic block diagram of a water purification system.

Referring to FIG. 6, there is illustrated a water purification system 500 comprising an evaporation device 100 as described above with reference to FIGS. 1 to 5. One or more such evaporation devices 100 may be used; in FIG. 6 an evaporator 510 comprising a bank of five evaporation devices 100 is illustrated. To enable modular assembly of such a bank of evaporation devices 100, the inner tube 10 of each evaporation device 100 may be provided with a snap-fit connector which may be self opening so that the evaporation device 100 automatically becomes part of the water circuit when it is added to the bank, and self closing when it is removed from the bank. Preferably, each evaporation device 100 is arranged with its outer tube 20 substantially vertical, in order to facilitate the flow of air upwards in the gap 30 by convection.

The water purification system 500 also comprises a water inlet channel 520 for conveying impure water to the inside of the first tube 10 of each evaporation device 100. As the impure water is vaporised through the hydrophilic membrane in the evaporation device 100 and humidifies the air in the gap 30, replacement impure water enters the first tube 10 through the water inlet channel 520. In the evaporator 510 illustrated in FIG. 6, the first tube 10 of each evaporation device 100 is coupled in parallel to the water inlet channel 520.

The water purification system 500 also comprises an air inlet 512 for supplying air 516 to the gap 30 of each evaporation device 100. When each evaporation device 100 is arranged with its outer tube 20 substantially vertical, the air inlet 512 is preferably at the lower end of the evaporation device 100, because air in the gap 30 will naturally rise by convection when heated. Such an air inlet 512 may be provided by installing the lower end of each evaporation device 100 above ground level. An air outlet 514 for extracting air 518 from the gap 30 of each evaporation device 100 is provided at the upper end of each evaporation device 100.

A condenser 530 condenses water vapour from the humidified air, thereby forming purified water. Preferably the condenser 530 is arranged above the evaporator 510 so that the humidified air can readily pass into the condenser 530. In other embodiments, an air path, such as ducting or such like, may be provided between the evaporator 510 and the condenser 530 to channel the humidified air from the evaporator 510 to the condenser 530. The purified water may be extracted from the condenser 530 by way of an outlet 535.

The evaporation devices 100 may be arranged to be heated by solar energy. This is absorbed by the outer tubes 20 of the evaporation devices 100 and then, in turn, heats the air within the gaps 30 and, to a lesser degree, the impure water within the inner tubes 10. The pervaporation process is improved by this heating as there is a greater amount of evaporative energy available. Similarly, overall humidification is improved by the heating because warm air can hold more water vapour than cold air. Also, as the air in the gaps 30 is heated, air flows by convection, drawing in un-humidified air through the bottom of the evaporation devices 100 and causing more air to be humidified.

As illustrated in FIG. 6, the condenser 530 may be located in the water inlet channel 520 such that the impure water passes through the condenser 530 on its way to the evaporator 510. At the condenser 530, the impure water would normally be relatively cold, as it may be drawn from the sea or a ground water supply. It can therefore operate to keep the condenser 530 cool and facilitate the condensing. The temperature of the impure water is also raised in the condenser 530 before it reaches the evaporator 510. This has the benefit of further heating the evaporator 510 and thereby improving the pervaporation process and humidification, for the same reasons as stated above.

The water inlet channel 520 comprises an optional heater 540 for heating the impure water prior to supplying the heated impure water to the evaporator 510. This can also improve the pervaporation process and humidification of the air, as stated above. The heater 540 may be, for example, a solar heat sink operating from solar energy thereby reducing the environmental impact of the system 500. If a heater 540 is employed to heat the impure water and also the impure water is passed through the condenser 530, the heater 540 should be located downstream of the condenser 530, such that the condenser 530 receives the coolest possible impure water. Heating the water in the heater 540 can also provide convection in the impure water in the part of the inlet channel 520 inside the heater 540, sufficient to cause flow of the water through the channel 520. Even without the heater, water heated elsewhere in the system will aid water circulation by convection.

The air inlet 512 comprises an optional fan 550 for forcing air through the gap 30. The fan 550 may be arranged to blow or suck the air through the gap 30. In this way a greater flow rate of air may provided, which can improve take up of the water vapour by the air.

The water inlet channel 520 comprises an optional sediment trap 560 for reducing the likelihood of sediment inhibiting the flow of impure water in the system 500. The sediment trap 560 is preferably located upstream of the condenser 530, heater 540 and the evaporator 510.

Also, in the embodiment illustrated in FIG. 6, there is a water outlet channel 570 for extracting impure water from the inner tube 10 of each evaporation device 100 in the humidifier 510. This enables a flow of impure water to be established, which enables freshly heated impure water to flow into each evaporation device 100, thereby bringing the stated benefits of heated water, and also reducing the likelihood of sediment accumulating in the evaporator 510 or in the constituent parts of the water inlet channel 520, which could reduce efficiency of the system 500. Optionally, a pump 580 may be provided for pumping the impure water through the water inlet channel 520 to the water outlet channel 570, thereby improving the flow of the impure water. The pump 580 may be solar powered to provide low cost operation and low environmental impact. Water emerging from the water outlet channel 570 may be returned to the source 590 of impure water, such as the sea, a well, or, a reservoir.

Optionally, impure water from the water outlet channel 570 may coupled back to the water inlet channel 520, with only the water lost through pervaporation needing to be replaced from the source of impure water. In this way impure water is re-used, which reduces the requirement for a supply of replacement impure water, making the system 500 suitable for purifying water in locations that do not have a plentiful supply of impure water.

Figure 7:
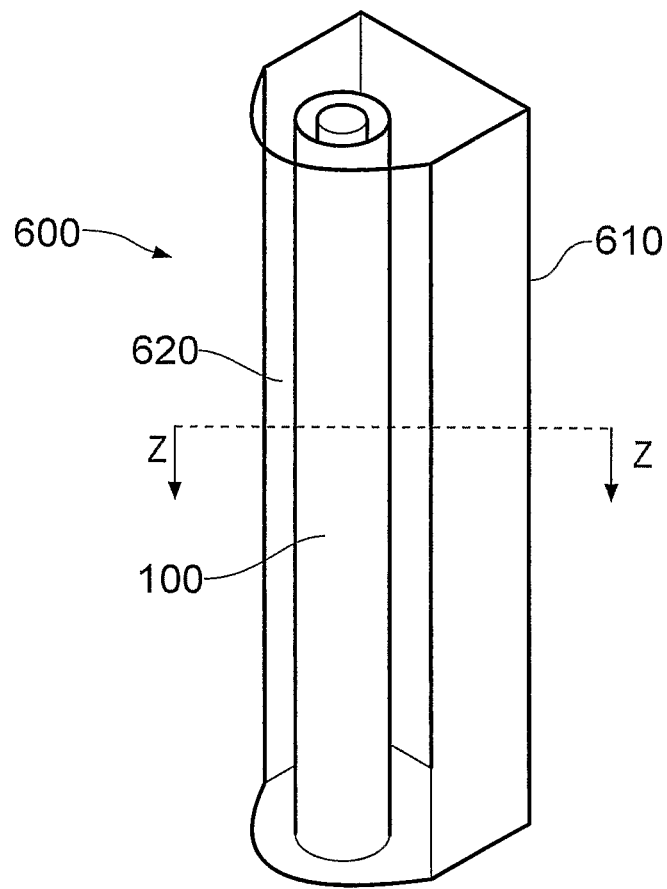
FIG. 7 is a perspective view of an evaporator module.
Figure 8:
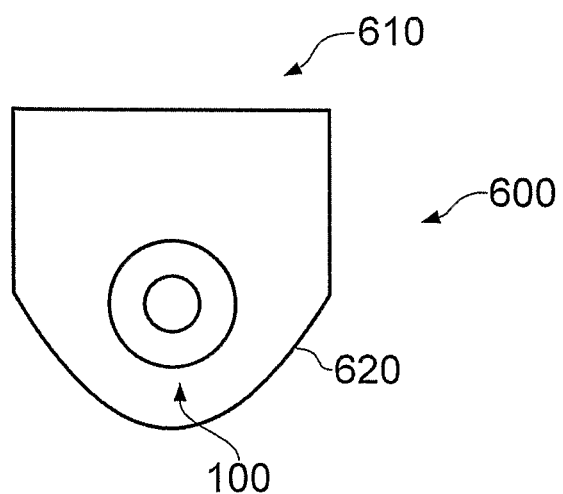
FIG. 8 is a cross-section through the evaporator module of FIG. 7, along line Z-Z.

Referring to FIGS. 6 and 7, in another preferred embodiment of the invention, the evaporation devices 100 may be housed in evaporation modules 600. Each module 600 comprises a housing 610 with a window 620. The housing 610 is elongate and can accommodate one or more evaporation devices 100. It is preferably made of an insulating material.

The window 620 is preferably curved outwardly from the housing 610. This helps to maximise the amount of solar radiation collected by the module 600. The inside surface of the window 620 preferably has a coating that reduces the amount of solar radiation that escapes from the module 600 through the window 620.

In use, the module 600 may be mounted in a position where it receives a large amount of solar radiation, e.g. on the outside of a building. Alternatively, it may be portable. The received solar radiation is collected in the module 600 due to the insulative nature of the housing 610 and the inward reflectiveness of the window 620, e.g. like an efficient greenhouse. Heating of the evaporation device(s) 100 in the module 600 by solar radiation is therefore improved.

The evaporator 510 of the system 500 illustrated in FIG. 6 may comprise one or more evaporation modules 600. The number of evaporation modules 600 can be varied in the same way as the number of evaporation devices 100.

The system 500 may also be adapted in other ways to suit the prevailing circumstances in different locations. For example, different forms of condenser 530 may be employed. In a cold region of the world, a sheet of glass, for example part of a building, cooled by the ambient temperature may be sufficient for performing the required condensation, whereas in other locations having an ample supply of solar energy, a powered condenser using active cooling, for example actively cooled fins, may be more appropriate.

Reference in the specification and claims to humidification (or equivalently hydration), purification and heating are not intended to signify any predetermined, respectively, humidity, purity and temperature, but merely signify an increase in, respectively, humidity, purity and temperature.

The invention claimed is:

1. An evaporation device for use in purifying water, comprising a first tube arranged within a second tube, a water inlet channel for supplying impure water into the first tube, wherein the first tube comprises a hydrophilic membrane, wherein a gap is provided between the first and second tubes for the flow of air, and wherein the gap contains an arrangement for creating turbulence in air flowing through the gap.

2. An evaporation device as claimed in claim 1, wherein the second tube is arranged substantially coaxially with the first tube.

3. An evaporation device as claimed in claim 1, wherein at least a portion of the first tube is coiled or arranged in a zig-zag configuration.

4. An evaporation device as claimed in claim 1, wherein the arrangement for creating turbulence comprises fins attached to either or both of the outside of the first tube and the inside of the second tube.

5. An evaporation device as claimed in claim 1, wherein the second tube comprises metal.

6. An evaporation device as claimed in claim 5, wherein the metal is copper.

7. An evaporation device as claimed in claim 1, wherein the inside of the second tube is coated with a black substance.

8. An evaporation device as claimed in claim 1, wherein the first and second tubes are arranged not to touch each other in the gap.

9. An evaporation device as claimed in claim 1, further comprising an evaporation module for housing the evaporation device.

10. An evaporation device as claimed in claim 9, wherein the evaporation module comprises an elongate housing with an outwardly curved window.

11. A system for purifying water, comprising: an evaporation device as claimed in claim 1 for humidifying air by pervaporation using the impure water supplied by the water inlet channel; and a condenser for condensing purified water from the air humidified by the evaporation device, the condenser being cooled by the impure water supplied by the water inlet channel before it is supplied to the evaporation device.

12. A system for purifying water as claimed in claim 11, wherein the water inlet channel comprises a heater for heating the impure water after it has been employed to cool the condenser and before supplying it to the evaporation device.

13. A system for purifying water as claimed in claim 12, wherein the heater is arranged to employ solar energy.

14. A system for purifying water as claimed in claim 11, comprising a pump for propelling water through the water inlet channel.

15. A system for purifying water as claimed in claim 11, wherein the water inlet channel comprises a sediment trap.

16. A system for purifying water as claimed in claim 11, wherein the impure water is arranged to pass through the first tube of the evaporation device.

17. A system for purifying water as claimed in claim 16, wherein the first and second tubes are arranged substantially vertically with an air inlet below an air outlet.

18. A system for purifying water as claimed in claim in claim 16, comprising an arrangement for forcing the air through the gap.

19. A method of purifying water, comprising: supplying impure water through an inlet channel; humidifying air with an evaporation device as claimed in claim 1 by pervaporation using the impure water supplied by the water inlet channel; and condensing purified water from the humidified air with a condenser that is cooled by the impure water supplied by the inlet channel before it is supplied to the evaporation device.

20. A method of purifying water as claimed in claim 19, comprising heating the impure water after it has been employed to cool the condenser and before supplying it to the evaporation device.

21. A method of purifying water as claimed in claim 20, comprising employing solar energy to heat the impure water.

22. A method of purifying water as claimed in claim 19, comprising propelling water through the water inlet channel using a pump.

23. A method of purifying water as claimed in claim 19, comprising trapping sediment in the water inlet channel using a sediment trap.

24. A method of purifying water as claimed in claim 19, wherein the step of humidifying the air comprises passing the impure water through the first tube of the evaporation device.

25. A method of purifying water as claimed in claim 24, wherein the first and second tubes are arranged substantially vertically, the method comprising passing the air upwards through the gap.

26. A method of purifying water as claimed in claim 24, further comprising the step of forcing the air through the gap.

* * * * *